United States Patent
Chimalamarri et al.

(10) Patent No.: US 11,347,750 B2
(45) Date of Patent: *May 31, 2022

(54) SEARCH RESULTS BASED ON SUBSCRIPTION INFORMATION

(71) Applicant: Apple Inc., Cupertino, CA (US)

(72) Inventors: Anshu Chimalamarri, Cupertino, CA (US); John Hornkvist, Cupertino, CA (US); Kevin Decker, San Jose, CA (US); Steve Falkenburg, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/733,480

(22) Filed: Jan. 3, 2020

(65) Prior Publication Data

US 2020/0218726 A1 Jul. 9, 2020

Related U.S. Application Data

(63) Continuation of application No. 14/869,300, filed on Sep. 29, 2015, now Pat. No. 10,534,778.

(Continued)

(51) Int. Cl.
*G06F 16/2457* (2019.01)
*G06F 16/9535* (2019.01)
(Continued)

(52) U.S. Cl.
CPC .... *G06F 16/24575* (2019.01); *G06F 16/2228* (2019.01); *G06F 16/248* (2019.01);
(Continued)

(58) Field of Classification Search
CPC .. G06F 16/24575; G06F 16/27; G06F 16/248; G06F 16/2228; G06F 16/9535;
(Continued)

(56) References Cited

U.S. PATENT DOCUMENTS 7,877,395 B2 * 1/2011 Sarukkai ................ G06F 16/78
707/754
8,190,706 B2 5/2012 Poder et al.
(Continued)

FOREIGN PATENT DOCUMENTS

CA 2663690 A1 * 4/2008 ......... H04L 65/4084

OTHER PUBLICATIONS

PCT International Preliminary Report on Patentability for PCT/US2016/025720 dated Dec. 5, 2017, 11 pages.

(Continued)

*Primary Examiner* — Dennis Truong
(74) *Attorney, Agent, or Firm* — Womble Bond Dickinson (US) LLP

(57) ABSTRACT

Search results are improved, in one embodiment, through the use of subscription information about the status of a subscription to content. The subscription information can be transmitted to a cloud storage service used by a user account of a device; later, a search query from the device causes the receipt of search results from a search using the subscription information and these search results can show the status of the subscription such as whether the content is playable.

17 Claims, 5 Drawing Sheets

Related U.S. Application Data

(60) Provisional application No. 62/171,963, filed on Jun. 5, 2015.

(51) Int. Cl.

| | | |
|---|---|---|
| *G06F 16/22* | (2019.01) | |
| *G06F 16/248* | (2019.01) | |
| *G06F 16/27* | (2019.01) | |
| *G06Q 20/40* | (2012.01) | |
| *G06Q 20/12* | (2012.01) | |

(52) U.S. Cl.
CPC ........ *G06F 16/24578* (2019.01); *G06F 16/27* (2019.01); *G06F 16/9535* (2019.01); *G06Q 20/123* (2013.01); *G06Q 20/40* (2013.01)

(58) Field of Classification Search
CPC . G06F 16/24578; G06Q 20/123; G06Q 20/40
See application file for complete search history.

(56) References Cited

U.S. PATENT DOCUMENTS

| | | | |
|---|---|---|---|
| 8,316,082 | B2 | 11/2012 | Igarashi |
| 8,504,583 | B1 | 8/2013 | Ke et al. |
| 8,639,679 | B1 | 1/2014 | Zhou |
| 8,812,474 | B2 | 8/2014 | Regan et al. |
| 8,832,056 | B2 | 9/2014 | Smyth et al. |
| 8,832,436 | B2 * | 9/2014 | Libonate ............... H04L 63/068 |
| | | | 713/168 |
| 8,904,289 | B2 | 12/2014 | Strober |
| 9,317,571 | B2 * | 4/2016 | Dykeman ............... G06F 16/43 |
| 10,534,778 | B2 * | 1/2020 | Chimalamarri ....... G06F 16/248 |
| 2008/0022298 | A1 * | 1/2008 | Cavicchia ............ H04N 21/482 |
| | | | 725/25 |
| 2008/0214155 | A1 | 9/2008 | Ramer et al. |
| 2008/0294603 | A1 * | 11/2008 | Ranjan ................ G06F 16/9537 |
| 2009/0082110 | A1 * | 3/2009 | Relyea .................. A63F 13/213 |
| | | | 463/42 |
| 2009/0319484 | A1 | 12/2009 | Golbandi et al. |
| 2011/0040895 | A1 * | 2/2011 | Griffin .................... H04L 67/02 |
| | | | 709/248 |
| 2012/0079606 | A1 * | 3/2012 | Evans .................. H04L 63/105 |
| | | | 726/28 |
| 2012/0174212 | A1 * | 7/2012 | Dart ...................... H04L 67/306 |
| | | | 726/19 |
| 2013/0060648 | A1 * | 3/2013 | Maskatia ......... H04N 21/25875 |
| | | | 705/22 |
| 2013/0060767 | A1 * | 3/2013 | Bowers .................. G06F 16/48 |
| | | | 707/724 |
| 2013/0144834 | A1 | 6/2013 | Lloyd et al. |
| 2013/0298216 | A1 * | 11/2013 | Kuznetsov .............. G06F 21/41 |
| | | | 726/8 |
| 2013/0311598 | A1 * | 11/2013 | Arrouye .............. H04L 67/1097 |
| | | | 709/217 |
| 2013/0347025 | A1 * | 12/2013 | Prakash ............. H04N 21/4227 |
| | | | 725/25 |
| 2014/0053182 | A1 * | 2/2014 | Jaager .................. H04N 21/632 |
| | | | 725/25 |
| 2014/0090075 | A1 | 3/2014 | Verma et al. |
| 2014/0136543 | A1 | 5/2014 | Frieden et al. |
| 2014/0282851 | A1 * | 9/2014 | Miller ..................... H04L 67/36 |
| | | | 726/1 |
| 2014/0325561 | A1 * | 10/2014 | Allen .................. H04N 21/4113 |
| | | | 725/38 |
| 2014/0379747 | A1 | 12/2014 | Majumder et al. |
| 2015/0193433 | A1 * | 7/2015 | Dykeman ............. G06F 16/252 |
| | | | 707/722 |
| 2016/0054905 | A1 * | 2/2016 | Chai .................. H04N 21/4826 |
| | | | 715/719 |
| 2016/0357737 | A1 | 12/2016 | Oklota et al. |

OTHER PUBLICATIONS

PCT International Search Report and Written Opinion of the International Searching Authority for PCT/US2016/025720 dated Jun. 28, 2016.

Alessandro Bozzon, et al., "Liquid Query: Multi-Domain Exploratory search On The Web", WWW 2010, Apr. 26-30, 2010, pp. 161-170, ACM, Raleigh, North Carolina, USA.

* cited by examiner

SEARCH RESULTS BASED ON SUBSCRIPTION INFORMATION

This application is a continuation of co-pending U.S. application Ser. No. 14/869,300 filed Sep. 29, 2015, which claims the benefit of the filing date of U.S. Provisional Application No. 62/171,963, filed on Jun. 5, 2015, which is incorporated herein by reference.

BACKGROUND OF THE INVENTION

The embodiments described herein relate to methods and systems for searching for information, such as searches on the Internet for content such as movies, etc.

Existing computer systems, tablet devices and smartphones can search for information by using a web browser and a search engine (e.g. Bing) to perform the searches. The searches can be directed to audiovisual content, such as movies or TV shows, for which a subscription is required to view the content. The subscription often requires a fee such as a monthly payment to the content provider that distributes the content. While the search may retrieve information about the content, there is no information about any subscription, even if a subscription by the user exists.

SUMMARY OF THE DESCRIPTION

The embodiments described herein can provide improvements in the results of a search by using subscription information about subscriptions to content from, for example, content providers. For example, the subscription information can, in one embodiment, be used to indicate, in the search results, a status of the subscription such as whether the content can be played. In one embodiment, the subscription information can be used to rank or sort the search results based on the subscription information; for example, the subscription information can be used to customize the search results to show items associated with a subscription with a higher rank (so they are listed first in a list of search results).

A method according to one embodiment can include one or more of the following operations performed on one or more client devices: receiving input, at a client device, to create subscription information about a subscription to content; transmitting the subscription information to a cloud storage service used by a user account of the client device; receiving, at the client device (or at another client device associated with the user account), an input which specifies a search query; transmitting the search query to one or more servers at least one of which searches information about content using the search query which can include the subscription information of the user account in one embodiment; receiving, at the client device (or at the another client device), search results in response to searching of the information, the search results indicating a status (e.g. valid and current; lapsed; expired, etc.) of the subscription to the content. In one embodiment, the status of the subscription can be indicated by an icon displayed in the search results, and wherein the icon, when selected (e.g. tapped or clicked), causes the presentation of the content (which may involve launching a content provider's application associated with the subscription). In one embodiment, the search results are ranked based on the subscription information and the ranked search results can also include one or more subscription status indicators. In one embodiment, the search query is entered into either a dedicated text input field in a user interface chrome of a web browser or a text input field in a system wide search application (which is configured to index full text content and metadata of at least some of the files stored on the client device). In one embodiment, this system wide search application can index content and metadata from different types of user files having different content and metadata (e.g. PDF files, Microsoft WORD and EXCEL and PowerPoint files; iTunes files, photos, HTML files, Pages files, email files, etc.). These files can be created or modified by the user and then indexed by the search application. In one embodiment, the searching can include searching for information from other information domains (in addition to searching the subscription information), and these information domains can include at least one or more of: social media postings (e.g. tweets on Twitter); current news; weather; maps; sports or sports news; or stocks.

In one embodiment, the content is provided by a content provider (e.g. a content creator or distributor such as HBO or Showtime, etc.) and includes at least one of: movies, TV shows, games, other audiovisual content, books, newspapers, or music, etc. In one embodiment, the content from the content provider is presented through an application ("app") that is also from the content provider (e.g. the app is created and controlled by the content provider and may be distributed by the content provider or by an app store). In one embodiment, the subscription information is created within such an app by a user using the app to obtain a subscription and once the subscription is created (e.g. the user authorizes a payment to the content provider), then the app calls, through an application program interface (API), subscription reporter software component (which is different and separate from the content provider's app) which in turn causes the subscription information to be uploaded to the user's account on the cloud storage service. In one embodiment, the subscription information can also be uploaded when the user simply logs into an existing subscription, such as when the user launches a content provider app and then logs into that app; the app can then call the subscription reporter to update the subscription information on the cloud storage service. The subscription reporter software component can receive such calls from a plurality of different apps from a plurality of different content providers, and thus this software component can provide a system level service for all such different apps. The subscription reporter component can also be called by a content provider's app to modify an existing subscription (e.g. extend or renew or change the level of subscription, etc.) or cancel a subscription. In those embodiments in which a subscription is created or modified by a user within a web browser, the web page can include a metatag (or in other embodiments, other data) that contains the subscription information; this subscription information can be created by the content provider's web page and stored in the DOM of the web page, and the web browser can use Javascript to extract the subscription information and then cause the subscription information to be uploaded (either directly the web browser or by communicating the subscription information to the subscription reporter) to the user's account on the cloud storage service.

In one embodiment, the cloud storage service can be used as a repository of the user's data, and this repository can be synchronized with one or more client devices used by the user, such as client devices that have been associated with the user's user account on the cloud storage service. The synchronization, in effect, provides a backup service from which the one or more client devices can be restored should any one of the client devices lose data (e.g. they are erased or become corrupted, etc.). The user can associate a device with the cloud storage service by, for example, entering a user account identifier (e.g. joemontana@iCloud.com) and a password and then activating or enabling the account with the cloud storage service. The subscription information created or any one of the user's devices can be treated as user data that is synchronized with the cloud storage service so that the user data can be shared across the user's devices. In one embodiment, in addition to the subscription information, the user data can also include one or more of: calendar data, contact data, apps purchased or installed, media content (e.g. an iTunes media library), photos, documents, email, reminders, notes, web browser bookmarks, passwords, or other data.

A method according to one embodiment can include one or more of the following operations performed on one or more servers (which are coupled through one or more networks to client devices); receiving a search query with subscription information automatically included as part of the search query; searching through content metadata using the search query and the subscription information to produce search results; transmitting, to a client device, the search results which include data indicating a status of a subscription to content. The status can, in one embodiment, indicate whether the content can be presented on the client device. In one embodiment, the search results can include the result of searching other information domains such as, for example, one or more of: social media postings (e.g. tweets on Twitter); current news; weather; maps; sports or sports news; or stocks. In one embodiment, the search results can be ranked based on the subscription information. In one embodiment, the content can include at least one of the following: movies, TV shows, other audiovisual content, newspapers, books or music. In one embodiment, the subscription information is received from a client device that is associated with the user account identifier and the subscription information stored in the cloud storage service for that user account identifier. In one embodiment, the cloud storage service also receives and transmits user data to synchronize user data on the client device with the user account specified by the user account identifier, and this user data can include, in addition to the subscription information, one or more of: calendar data, contact data, apps purchased or installed, media content on the user's client devices (e.g. an iTunes media library), photos, documents, emails, reminders, notes, web browser bookmarks, passwords, or other data.

The embodiments described herein also include data processing systems such as a data processing system (on a client device) that includes a system wide search module that is configured to index content and metadata for files stored on the system and a subscription reporter module that is configured to transmit subscription information, such as subscription information about a plurality of different subscriptions from different content providers, to a cloud storage service used by a user account of the system, and a network communication module that is configured to receive search results from searching of information, wherein the search results indicate a status of the subscription. The search results are in response to a search query entered into an input field of the system wide search module.

In alternate embodiments, the search query is transmitted without the subscription information, and the subscription information for the user's account is retrieved from the cloud storage service and used to provide search results based on the retrieved subscription information and the results from searching for content that matches the search query and the retrieved subscription information.

The various embodiments described herein can be implemented in client devices and in server systems and in methods and in non-transitory machine readable storage media that store executable program instructions which when executed can cause a data processing system (such as a client device or a server system) to perform any one or more of the methods described herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 3 also shows that one or more servers can perform searches, such as searches directed to content.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
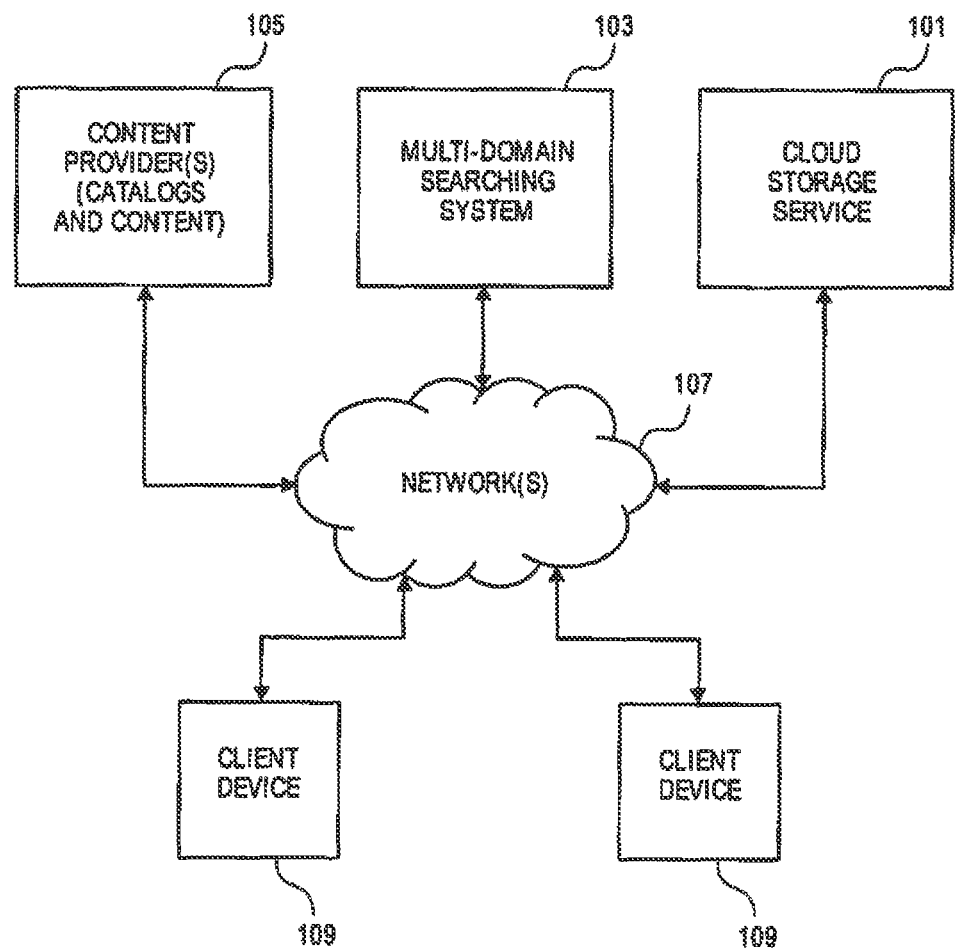
FIG. 1 shows an example of a system of one or more client devices that are coupled through one or more networks (e.g. the Internet) to one or more servers that provide for searching of information and also storage of information such as subscription information stored on a cloud storage service.

Subscription information about subscriptions to content can be used to improve the results of searches, such as searches for content, and this subscription information can be stored in a cloud storage service that can be synchronized across the client devices (e.g. laptop computer, tablet computer and smartphone) of a user. FIG. 1 shows an example of a system of one or more client devices 109 and 111 coupled through one or more networks 107 (e.g., the Internet) to one or more servers, including one or more servers 105 for content providers (which may host both content and browsable catalogs for that content), one or more servers 103 for searching such as multidomain searching, and one or more servers 101 for the cloud storage service implemented through servers 101. The client devices 109 and 111 can be any one of the data processing systems that a user may use to access content or information including computers (laptop, desktop, etc.), tablet computers, smartphones, game player devices (e.g. X-box), wearable device or other consumer electronic device. The client devices 109 and 111 can be used by the same user (e.g. device 109 is a laptop computer of the users and device 111 is a smartphone of the user and both devices have activated or enabled a user account for the user on the cloud storage service provided by servers 101); alternatively, client devices 109 and 111 can be used by different users, each with their own user account on the cloud storage service provided by one or more servers 101. The client devices 109 and 111 can each include the components or software modules shown in FIG. 5 and can each perform the methods shown in FIGS. 2 and 4 and present the user interfaces shown in FIGS. 6-8. Further descriptions in conjunction with FIGS. 2, 4 and 5-8 will be provided below.

The cloud storage service can be implemented with one or more servers 101 and can be configured to establish a cloud user accounts with multiple users, each of which may have multiple devices. The iCloud service from Apple Inc. of Cupertino, Calif. is an example of one such cloud storage service which can establish and provide multiple cloud storage accounts for multiple users, each of which can potentially have multiple client devices synchronized with the cloud storage service. The cloud storage service can establish a user account with one or more of the user's devices by receiving information from each such device such as a device identifier (optional) and a user account identifier (e.g. joe.user@iCloud.com) and a password. After a client device has established a cloud account with the cloud storage service (provided by one or more servers 101), user data from the client device can be uploaded to servers 101, and this user data can include subscription information about subscriptions to content and optional other user data. This subscription information can result from the creation or modification of a subscription to content such as a subscription to content from a content provider such as HBO, Showtime, etc. The subscription information can include information identifying a content provider and a status of the subscription (e.g. registration or cancellation of a subscription; expiration data, level of subscription such as basic, enhance, premium, etc., and optional information). The subscription information may specify specific content provided by a content provider (e.g. only "basic" movies for "basic" subscribers who pay less than premium subscribers or specific content such as sports articles only for a newspaper subscription, etc.) or may not limit the content available from a content provider such that all content from that content provider's subscription is available under the subscription). The other user data that may also be uploaded to the cloud storage service can be uploaded at the same time as uploading the subscription information or at a scheduled time that is different than when the subscription information is uploaded. The other user data can include different types of user data including, for example, one or more of: calendar data, contact data, apps installed, media content (e.g. an iTunes media library of the user), photos, documents, emails, reminders, notes, web browser bookmarks, passwords, or other data. The server(s) 101 of the cloud storage service are configured to interact with the subscription reporter modules of client devices 109 and 111 for the purpose of receiving and storing subscription information. The user data is uploaded to the one or more servers 101 in one embodiment on a repeated basis in order to back up the client devices of a user and to synchronize each such client device with the cloud storage services for any potential restore or device recovery operation should a device become either intentionally or unintentionally erased or otherwise need to be restored. In one embodiment the one or more servers 101 are operated by an entity that controls the cloud storage service while the content is provided by content providers who are different entities that operate the set of servers 105. These servers 105 may be a set of websites that provide the content or may be a set of servers that provide content provider apps to client devices, such as client devices 109 and 111, either directly or through an app store (such as an app store provided by the entity which also operates the cloud storage service implemented by one or more servers 101. The apps provided by these content providers can be the same apps used on client devices to create or modify subscriptions (and thereby create subscription information which is uploaded to one or more servers 101) and to present the content provided through the subscription.

The one or more servers 103 can provide for searching of content information such as information obtained from or stored on the one or more servers 105 and optionally search other information domains. The one or more servers 103 are configured to receive one or more search queries from one or more client devices (such as devices 109 and 111) and then perform searches through data for results that match the search query and then these results are ranked and returned to the client device that sent the search query. For example if a client device with an associated user account for the cloud storage service, such as client device 109, received the search query "Jurassic Park" from the user of that device, the device transmits the search query (with the subscription information for that client device automatically included as part of the search query) to one or more servers 103 which in turn cause a search of matching content and subscription information for that device (e.g. content metadata that includes the phrase "Jurassic Park" from a content provider having a matching subscription information which indicates the device has a subscription with that content provider) and any matching results ("hits or matches") are then found and returned to the client device. In addition, the one or more servers 103 can search other information domains using the same search query and return matching search results (such as news about an upcoming sequel to the movie "Jurassic Park"). The other information domain can include one or more of: social media postings (e.g. tweets on Twitter); current news; current movies; weather; maps; sports or sports news; or stocks. The search results from searching the content information (or the combined search results from the content information and the other information domains) are ranked based on relevance and/or other factors and then sent back to the client device that transmitted the search query. In one embodiment, the set of one or more servers 103 can be implemented in the manner described in U.S. patent application Ser. No. 14/503,226, filed Sep. 30, 2014 and entitled "Multi-Domain Query Completion", which U.S. patent application is hereby incorporated herein by reference.

Figure 2:
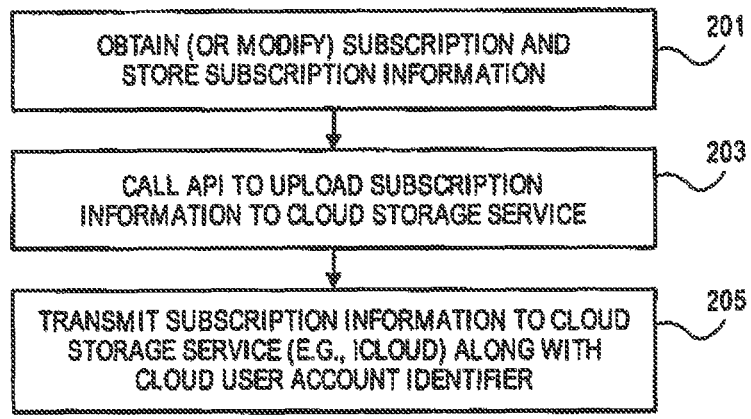
FIG. 2 is a flowchart which shows an example of a method, which can be performed at a client device, for obtaining and uploading subscription information to a cloud storage service.

FIG. 2 provides an example of a method according to one embodiment for operating a client device such as one of the client devices 109 or 111. In operation 201, a user who is operating the client device can obtain a subscription to content (e.g. purchase a one-year subscription to HBO or purchase a subscription to an electronic version of the New York Times, etc.) or modify an existing subscription (e.g. renew, extend or cancel an existing subscription or change the level of a subscription from basic to premium, etc.). In one embodiment, a user may not even need to create or modify their subscription; the user may simply log into the content provider's app if they have an existing subscription already and this results in the call (described below) being made to cause the subscription information to be uploaded to the cloud storage service to thereby synchronize their subscription information to the cloud storage service. Operation 201 can be performed in one embodiment in an app or application from the content provider that creates and/or distributes the content (e.g. HBO or New York Times) or can be performed in another embodiment in a web browser which processes a web page or set of web pages from the content provider. In either case, operation 201 produces a set of subscription information that is stored locally on the client device at least until the subscription information is uploaded (in operation 205) to a cloud storage service such as the cloud storage service shown in FIG. 1. In one embodiment, the subscription information may be retained in non-volatile storage on the client device after it is uploaded to the cloud storage device and is used each time a search query is transmitted to servers 103 (in that embodiment, the subscription information is automatically without user input or request added to the search query so that searches are performed looking for matches to both terms in the search query and terms in the subscription information). In one embodiment, the subscription information can include a set of information such as: content distributor identification; status of subscription (e.g. valid and playable); expiration date or time to live; and optional information. In operation 203, the subscription creation process (in an app) can call, through an Application Program Interface (API), a subscription reporter module (such as the module 507 shown in FIG. 5) which, in response to the call, uploads the subscription information (along with the user's cloud user account identifier), in operation 205, to the cloud storage service. The call can include the subscription information as parameters or data passed in the call from the app to the subscription reporter module. This call or API can be referred to as a subscription awareness API call. In the embodiment in which a web browser is used to create or modify a subscription, the web page can be configured by the content provider to include one or more metatags in the DOM of the web page which can cause the web browser to extract the metatag (which contains the subscription information), and then the web browser can either, in one embodiment, directly upload the subscription information to the cloud storage service or in another embodiment can call the subscription reporter module to do so.

Figure 3:
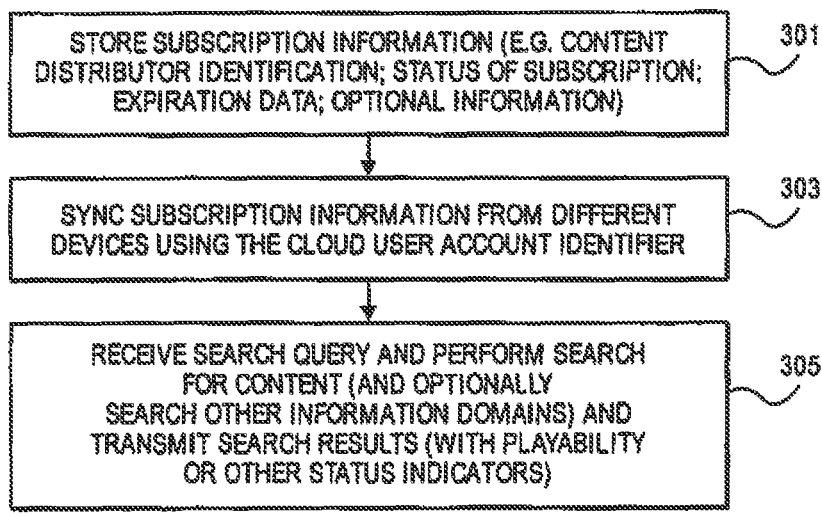
FIG. 3 shows a flowchart that provides an example of a method, performed at one or more servers, for processing subscription information according to one embodiment.

FIG. 3 shows an example of a method according to one embodiment for operating one or more servers 101 that implement a cloud storage service. In operation 301, after the subscription information is received from one or more client devices (such as devices 109 and/or 111 in FIG. 1), the subscription information (and the associated user account identifier received from the client device) is stored on the one or more servers that implement a cloud storage services such as the one or more servers 101. If the user uses another client device (also associated with the same cloud user account identifier) to create or modify subscriptions, the one or more servers in operation 303 synchronize the subscription information (and optionally other user data as described herein) on the servers of the cloud storage service with that another client device; this enables the cloud storage service to have a complete set of subscription information even if the same user created different subscriptions on different client devices (each of which was enabled to use the user's cloud storage account), and this also enables the user to be able to input a search query on any one of the user's client device (which was enabled to use the user's cloud storage account) and to receive the search results that indicate the status of all subscriptions (created on different client devices by the same user). In operation 305, one or more servers 103 receive a search query (which includes the subscription information automatically obtained from the device sending the query) from one of the client devices (e.g. devices 109 or 111) and then perform a search for matches to the search query found in the content information such as metadata for content provided by servers 105. In addition, the one or more servers 103 can also search for matches to the search query across one or more other information domains such as: social media postings (e.g. Twitter content); current news; weather; maps; sports or sports news; or stocks. The matches or hits from these one or more searches are then combined and ranked, in one embodiment, and then transmitted back to the client device that transmitted the search query. In one embodiment, the ranking can be based on the subscription information, and the subscription information can be used to indicate, for a content item in the search results, the status of a subscription to the content such as whether the content is playable.

Figure 8:
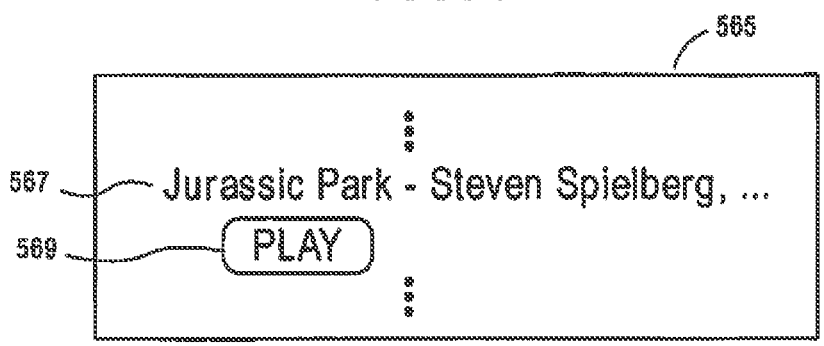
FIG. 8 shows an example of search results from one or more embodiments described herein where the search results include an indicator of the status of a subscription to content.

FIG. 8 shows an example of a result 567 within search results 565 where the search query was the phrase "Jurassic Park". The search query transmitted to servers 105 also included the subscription information from the device that transmits the query, and this causes the servers to look for matches to both terms in the search query and to the subscription information. The search results will likely include many other matches if other information domains were searched (such as Twitter tweets, etc.). In this example, the search through the content information (server(s) 105) found both matching content and matching subscription information for the content (in this case a movie called Jurassic Park) and found that at least one subscription for that content was valid so that the content (the movie Jurassic Park) is currently playable, and thus the status indicator (a PLAY button 569) in this example is shown next to the search result 567. If the user selects the PLAY button 569, then in one embodiment the content is presented, which may cause a player to launch (such as a player app provided by the content provider of the version of the movie Jurassic Park provided by that content provider). If the subscription was not valid then a different status indicator (e.g. expired subscription) may be displayed next to the search result 567 or no status indicator may be displayed.

Figure 4:
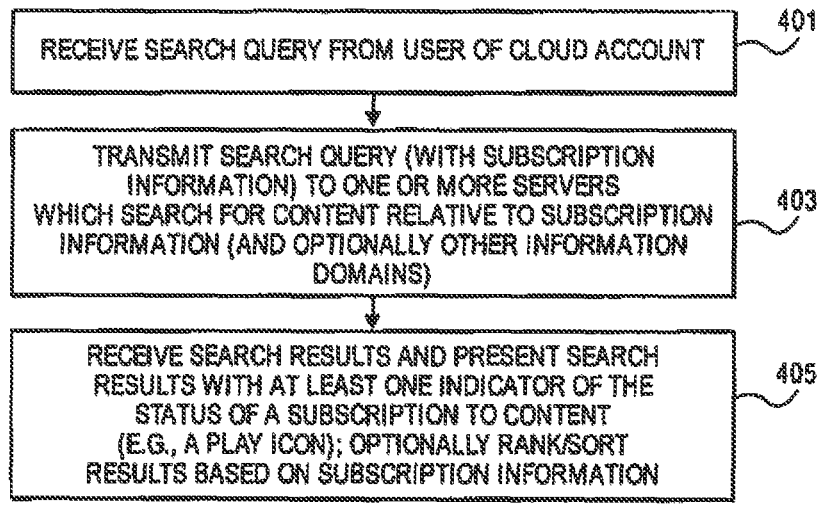
FIG. 4 is a flowchart that shows an example of a method, which can be performed at a client device, for performing searches, such as searches for content for which a subscription may exist.

FIG. 4 shows an example of a method performed by a client device (such as device 109 or 111) according to one embodiment. This method can be performed after subscription information has been uploaded for a user cloud account of the client device. The client device in operation 401 receives a search query from the user (e.g., the user types or speaks a search query such as "Jurassic Park"), and then the search query (and the user's local copy of the user's subscription information) is transmitted, in operation 403, to one or more servers (e.g., servers 103) which search the content information using the search query and the subscription information. The server(s) which perform the searching may include any one of servers 105 or 103 or both, and other information domains may also be searched in certain embodiments (examples of these other information have been described herein, including with respect to operation 305 in FIG. 3). The results from the searching these server(s) are then combined (if multiple domains were searched) and ranked and transmitted back to the client device that sent the search query, and then the client device receives and displays the search results in operation 405. In one embodiment, the search results can be ranked based on the subscription information (e.g. matches for playable content found in the subscription information are ranked higher in a search results list than other matches). In one embodiment, the search results can include one or more indicators (e.g., PLAY button 569 shown in FIG. 8) of the status of the subscription for the content; these indicators in one embodiment are presented only if the subscription's status is validated or verified by obtaining the subscription information on the user's device.

Figure 5:
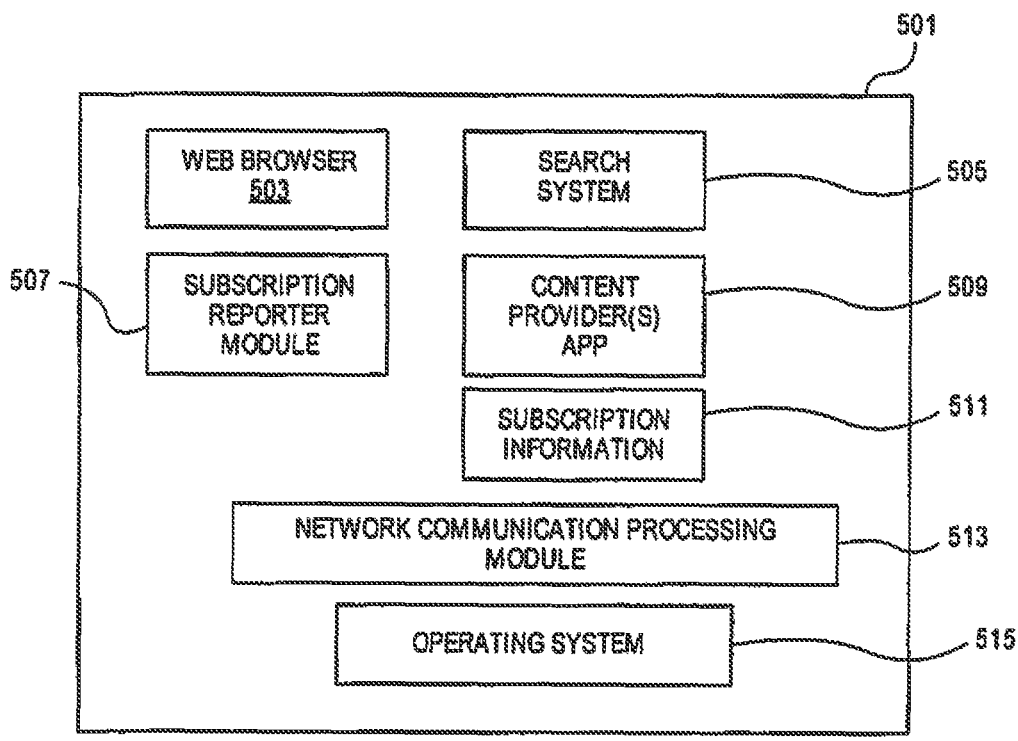
FIG. 5 shows an example of a client device which can include software components or modules for operating the client device in accordance with one or more embodiments described herein.

FIG. 5 shows an example of various modules (e.g., software components) on a client device that may be used with the embodiments described herein. The client device 501 shown in FIG. 5 can be either client device 109 or 111 and can perform the methods shown in FIGS. 2 and 4. The client device 501 includes non-transitory computer readable media such as one or more of DRAM and flash memory or a hard drive that can store these components. The components include web browser 503, search system 505, subscription reporter module 507, content provider apps 509, subscription information 511, network communication processing module 513 and an operating system 515. The web browser 503 can be a conventional web browser which processes HTML and Javascript in web pages, such as a web page from a content provider.

Figure 7:
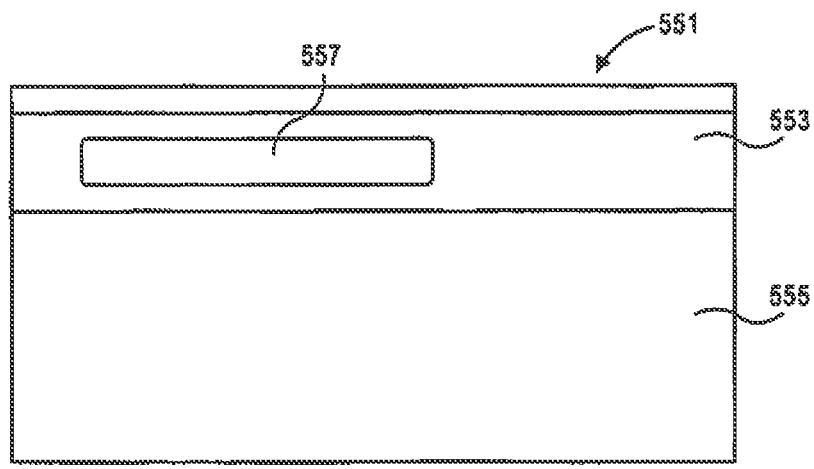
FIG. 7 shows an example of a user interface of a system wide search application (such as Spotlight) which can be used with any one of the embodiments described herein.

The search system 505 can be search software which performs system wide searching of a plurality of different files of different file types and which also indexes content and metadata from those files stored locally ("local content") on the client device. In one embodiment, the system wide search software can be similar to the Spotlight software from Apple Inc. of Cupertino, Calif. The search system software 505 can display a user interface for receiving search queries and for presenting search results. FIG. 7 shows an example of such a user interface. In particular, the search application window 551 includes a frame 553 and a content or results portion 555. Within the frame 553 there is a text input field 557 which can receive the search queries from a user and perform searches of both local content (which can be indexed in an inverted index) as well as the content information described herein and potentially other searching of other information domains also described herein. It will be appreciated that this searching, using a search query entered into text input field 557, can provide matches from content or metadata (or both content and metadata) from locally stored files and matches from the content information stored in the service maintained by one or more servers 105 and/or 103; in addition, this searching can also provide matches from the multidomain searching performed by one or more servers 103. In one embodiment, this searching is directed at specific sources of information (e.g. the user's local files and subscription and optionally other limited information domains) but is not a general web/internal search using a web search engine such as Google or Bing or Yahoo, etc.

Referring back to FIG. 5, the subscription reporter module 507 can provide the subscription information reporting to cause the uploading of subscription information to the cloud storage service as described herein. The subscription information, such as subscription information 511 can be at least temporarily stored on the client device before it is uploaded to the cloud storage service as described herein. The uploading can be performed with a network communication processing module 513 which can use conventional protocols to transmit the subscription information during the upload process to the cloud storage service. All of these various components run on an operating system, such as the operating system 515 which executes on the client device 501. The web browser 503 in one embodiment can extract the subscription information from a metatag within a web page and store that subscription information at least temporarily as subscription information 511 prior to uploading the subscription information to the cloud storage service.

Figure 6:
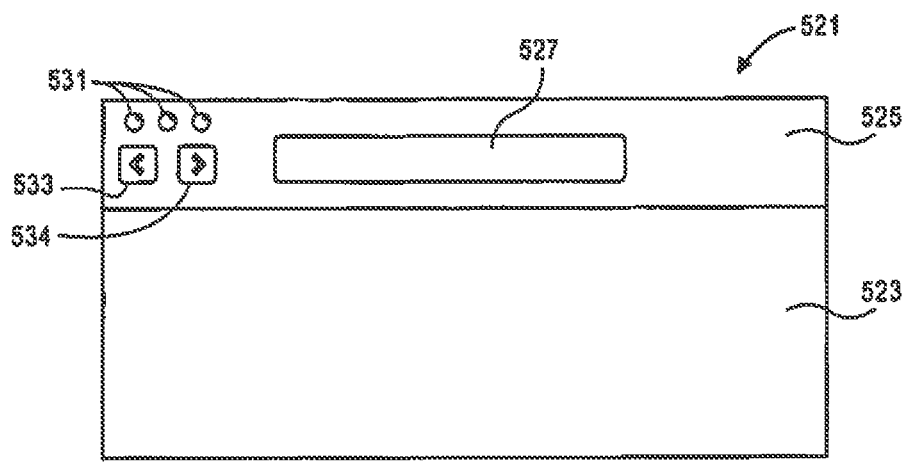
FIG. 6 shows an example of the user interface of a web browser which can be used with any one of the embodiments described herein.

In one embodiment, the search queries described herein (such as the search queries referred to in operation 305 or the search query referred to in operation 401) can be received within a text input field in a system wide search application (such as search system 505) which has an interface such as that shown in FIG. 7. The entry of text into that text input field such as input field 557 can cause the searching of content information as well as searching for locally stored content and metadata and potentially other information domains as described herein. Similarly, a web browser user interface chrome (as shown in FIG. 6) can include a text input field, such as text input field 527 shown within the frame 525 of the web browser window 521. This text input field 527 can receive the search queries described herein and cause the searching of the content information as well as potentially other information domains as described herein and then return results within the content region 523 of the web browser window 521. The web browser window 521 shown in FIG. 6 can include conventional user interface controls for a window such as window controls 531 to expand, minimize, or remove the window. In addition, the web browser window 521 can include conventional web browser user interface controls such as back and forward buttons 533 and 534. In one embodiment of a web browser, the searching performed in response to a search query entered into text input field 527 is limited to the content information and the other information domains provided by one or more servers 103; in another embodiment of a web browser, the searching performed in response to a search query entered into text input field 527 includes a web based search (using a conventional web search engine such as Google or Bing or Yahoo) as well as a search through the subscription information and optionally the other information domains provided by one or more servers 103.

Figure 9:
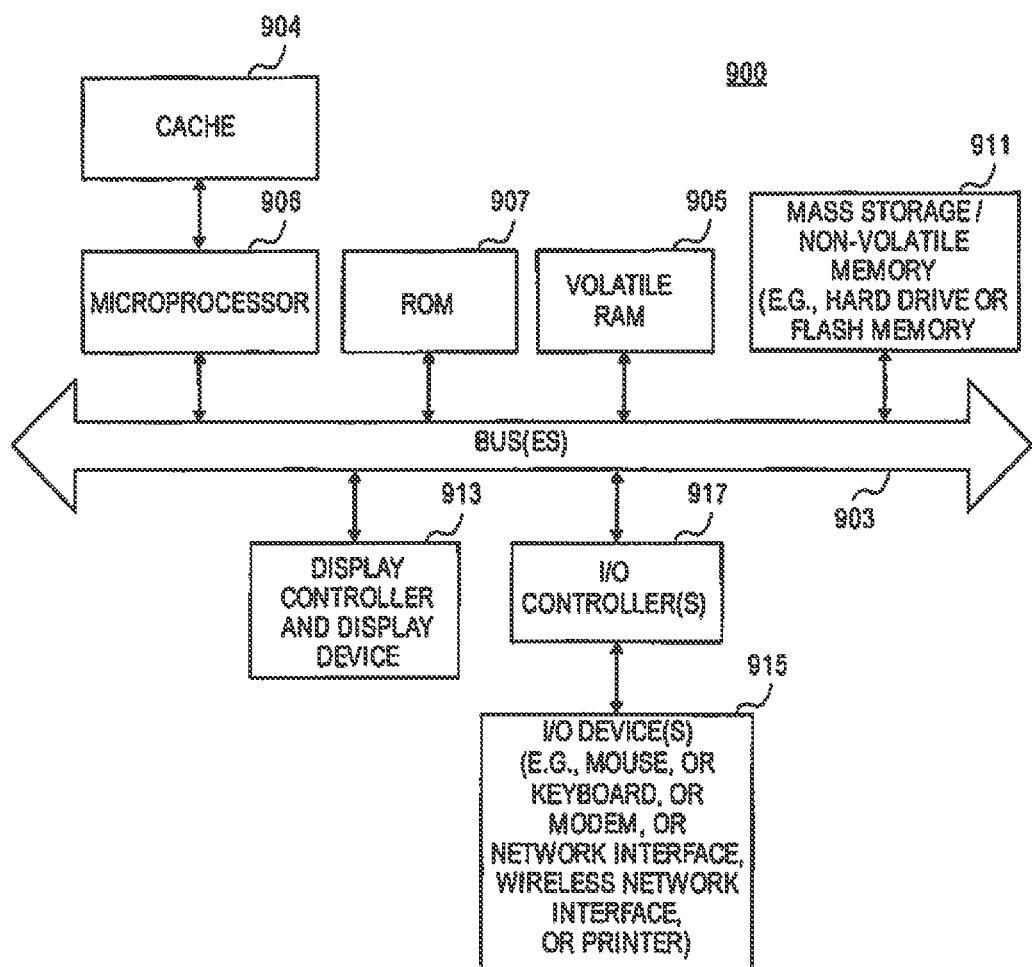
FIG. 9 shows an example of a data processing system which can be used in one or more embodiments described herein.

FIG. 9 shows one example of a data processing system, which may be used with any one of the embodiments described herein. Note that while FIG. 9 illustrates various components of a data processing system, it is not intended to represent any particular architecture or manner of interconnecting the components as such details are not germane to this description. It will also be appreciated that network computers, tablet computers, smartphones, laptop computers, desktop computers, other consumer electronic devices and other data processing systems which have fewer components or perhaps more components than those shown in FIG. 9 may also be used with one or more embodiments described herein. The servers described herein can be implemented in a form similar to that shown in FIG. 9, and the client devices described herein can be implemented in a form similar to that shown in FIG. 9.

As shown in FIG. 9, the computer system 900, which is a form of a data processing system, includes a bus 003 which is coupled to one or more microprocessor(s) 906 and a ROM (Read Only Memory) 907 and volatile RAM 905 and a non-volatile memory 911. The microprocessor 906 is coupled to optional cache 904. The microprocessor 906 may retrieve the stored instructions from one or more of the memories 907, 905 and 911 and execute the instructions (in one or more cores) to perform operations described above. These memories represent examples of machine readable non-transitory storage media that can store or contain computer program instructions which when executed cause a data processing system to perform the one or more methods described herein. The bus 903 interconnects these various components together and also interconnects these components 906, 907, 905 and 911 to a display controller and display device 913 and to peripheral devices such as input/output (I/O) devices 915 which may be one or more of mice, touch screens, touch pads, touch sensitive input devices, keyboards, modems, network interfaces, printers and other devices which are well known in the art. Typically, the input/output devices 915 are coupled to the system through input/output controllers 917. The volatile RAM (Random Access Memory) 905 is typically implemented as dynamic RAM (DRAM) which requires power continually in order to refresh or maintain the data in the memory.

The mass storage 911 is typically a magnetic hard drive or a magnetic optical drive or an optical drive or a DVD RAM or a flash memory or other types of memory system which maintain data (e.g., large amounts of data) even after power is removed from the system. Typically the mass storage 911 will also be a random access memory although this is not required. While FIG. 9 shows that the mass storage 911 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method comprising:

receiving input, at a first device of a plurality of client devices, to create a subscription information about a subscription to content;

transmitting, with the first device, the subscription information to a cloud storage service, the subscription information about a subscription to content and the subscription information is synchronized among the plurality of client devices, wherein the subscription information is created with a first application that uploads the subscription information to the cloud storage service's user account of the first device, the user account associated with global user identifier, the first application is one of a plurality of applications executing on the first device associated with the global user identifier;

receiving, at a second device of the plurality of client devices, a search query associated with the content using the first application executing on the second device and without a user request to include the subscription information, the first application is associated with the global user identifier;

transmitting the search query to one or more servers;

receiving search results in response to searching of information using the search query.

2. The medium as in claim 1 wherein the subscription information can identify a content provider.

3. The medium as in claim 1 wherein the search results are ranked.

4. The medium as in claim 1 wherein each of the plurality of applications is for a different content provider.

5. The medium as in claim 1 wherein the content includes at least one of: movies, TV shows, other audiovisual content, books, or music.

6. The medium as in claim 5 wherein the search results include results from other information domains including at least one or more of: social media postings; current news; weather; maps; sports; or stocks.

7. The medium as in claim 1 wherein the subscription information is created within an application that calls, through an application program interface (API), a subscription reporter to upload the subscription information to the cloud storage service's user account of the client device.

8. The medium as in claim 1, wherein a change in the subscription on the second device is synchronized with the subscription information stored on the first device.

9. The medium as in claim 1, wherein the method further comprises:

transmitting user data to the cloud storage service to synchronize user data on the client device with the user account on the cloud storage service.

10. The medium as in claim 9 wherein the cloud storage service is operated by a first party and the content is provided by other parties that are different than the first party.

11. A machine implemented method comprising:

receiving input, at a first device of a plurality of client devices, to create a subscription information about a subscription to content;

transmitting, with the first device, subscription information to a cloud storage service, the subscription information for a subscription to content and the subscription information is synchronized among the plurality of client devices, wherein the subscription information is created with a first application that uploads the subscription information to the cloud storage service's user account of the first device, the user account associated with global user identifier, the first application is one of a plurality of applications executing on the first device associated with the global user identifier;

receiving, at a second device of the plurality of client devices, a search query associated with the content using the first application executing on the second device and without a user request to include the subscription information, the first application is associated with the global user identifier;

transmitting the search query to one or more servers;

receiving search results in response to searching of information using the search query.

12. The method as in claim 11 wherein the subscription information can identify a content provider.

13. The method as in claim 12 wherein the search results are ranked.

14. The method as in claim 12 wherein the content includes at least one of: movies, TV shows, other audiovisual content, books, or music; and wherein the status indicates whether the content can be presented on the client device and wherein the search results include results from other information domains including at least one or more of: social media postings; current news; weather; maps; sports; or stocks; and wherein the subscription information is automatically included in the search query without a user request to include the subscription information in the search query.

15. A data processing system comprising:
a processing system;
an input device coupled to the processing system;
a display coupled to a processing system;
a subscription reporter module that is configured to transmit subscription information, about a subscription, to a cloud storage service used by a user account of the data processing system, wherein, the subscription information about a subscription to content and the subscription information is synchronized among the plurality of client devices, wherein the subscription information is created with a first application that uploads the subscription information to the cloud storage service's user account of the first device, the user account associated with global user identifier, the first application is one of a plurality of applications executing on the first device associated with the global user identifier;

a network communication module that is configured to transmit a search query, received through the input device, the search query associated with the content using the first application executing on the second device and without a user request to include the subscription information, the first application is associated with the global user identifier, and the network communication module is configured to receive search results from searching of information.

16. The system of claim 15 wherein the search query is from either a dedicated search input field in a user interface chrome of a web browser or in an input field of a user interface of the system wide search module.

17. A non-transitory machine readable medium storing executable program instructions which when executed by a data processing system cause the data processing system to perform a method comprising:

receiving input, at a first device of a plurality of client devices, to create a subscription information about a subscription to content;

transmitting, with the first device, the subscription information to a cloud storage service, the subscription information about a subscription to content and the subscription information is synchronized among the plurality of client devices, wherein the subscription information is created with a first application that uploads the subscription information to the cloud storage service's user account of the first device, the user account associated with the global user identifier, the first application is one of a plurality of applications executing on the first device associated with the global user identifier;

receiving, at a second device of the plurality of client devices, a search query associated with the content using the first application executing on the second device and without a user request to include the subscription information, the first application is associated with the global user identifier;

transmitting the search query to one or more servers at least one of which searches the subscription information of the user account;

receiving search results in response to searching of the subscription information.

* * * * *